(12) United States Patent
Komai

(10) Patent No.: US 8,957,853 B2
(45) Date of Patent: Feb. 17, 2015

(54) VIDEO DATA PROCESSING APPARATUS AND METHOD

(71) Applicant: Fujitsu Limited, Kawasaki (JP)

(72) Inventor: Hiroyuki Komai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/650,878

(22) Filed: Oct. 12, 2012

(65) Prior Publication Data

US 2013/0038527 A1 Feb. 14, 2013

Related U.S. Application Data

(63) Continuation of application No. PCT/JP2010/057408, filed on Apr. 27, 2010.

(51) Int. Cl.
```
G09G 5/00       (2006.01)
H04N 21/488     (2011.01)
H04N 21/44      (2011.01)
H04N 21/478     (2011.01)
```

(52) U.S. Cl.
CPC ..... *H04N 21/4882* (2013.01); *H04N 21/44008* (2013.01); *H04N 21/478* (2013.01)
USPC ......................................... 345/156; 386/291

(58) Field of Classification Search
CPC .... G06F 3/01; H04N 21/44008; H04N 21/47; H04N 21/472; H04N 21/47214; H04N 21/482; H04N 21/83; H04N 21/84; H04N 21/4882; H04N 21/478; H04N 5/4403; H04N 5/4448; H04H 60/59
USPC ......... 345/156; 348/E5.105, E5.107, E5.108; 365/145; 386/291
See application file for complete search history.

(56) References Cited

U.S. PATENT DOCUMENTS

| | | | |
|---|---|---|---|
| 7,996,867 B2 * | 8/2011 | Uchida et al. | 725/58 |
| 2001/0002832 A1 * | 6/2001 | Hoshi | 345/327 |
| 2005/0131950 A1 * | 6/2005 | Lee | 707/104.1 |
| 2006/0072354 A1 * | 4/2006 | Ohnuma et al. | 365/145 |
| 2006/0078299 A1 * | 4/2006 | Hasegawa | 386/83 |
| 2006/0140581 A1 * | 6/2006 | Inoue et al. | 386/83 |
| 2006/0265731 A1 * | 11/2006 | Matsuda | 725/131 |

(Continued)

FOREIGN PATENT DOCUMENTS

| | | |
|---|---|---|
| JP | 2003-331181 | 11/2003 |
| JP | 2005-128659 | 5/2005 |

(Continued)

OTHER PUBLICATIONS

International Preliminary Report on Patentability, dated Dec. 10, 2012, in corresponding International Application No. PCT/JP2010/057408 (6 pp.).

(Continued)

*Primary Examiner* — Tom Sheng
(74) *Attorney, Agent, or Firm* — Staas & Halsey LLP

(57) ABSTRACT

An information processing apparatus (1) includes a display control unit to output a video to a display device (13) on the basis of video data containing a plurality of picture frames; an operation unit (14) to accept a user's operation, and a registering unit to extract date and time information from an operation target picture frame corresponding to the video that is output when accepting the operation and to register a schedule so as to output information contained in the video at a date and time of the extracted date and time information.

9 Claims, 17 Drawing Sheets

(56) References Cited

U.S. PATENT DOCUMENTS

| | | | |
|---|---|---|---|
| 2007/0150326 A1 | 6/2007 | Nakao et al. | |
| 2007/0242928 A1 | 10/2007 | Tanabe | |
| 2008/0002943 A1* | 1/2008 | Kitayama et al. | 386/83 |
| 2008/0098433 A1* | 4/2008 | Hardacker et al. | 725/52 |
| 2008/0124046 A1 | 5/2008 | Hiramatsu et al. | |
| 2009/0131030 A1* | 5/2009 | Kim | 455/418 |
| 2009/0328100 A1 | 12/2009 | Horiguchi | |
| 2010/0011348 A1* | 1/2010 | Honma et al. | 717/168 |
| 2010/0020188 A1* | 1/2010 | Yamaguchi | 348/220.1 |
| 2010/0125870 A1* | 5/2010 | Ukawa et al. | 725/32 |
| 2010/0199309 A1* | 8/2010 | Kataoka et al. | 725/43 |
| 2011/0050564 A1* | 3/2011 | Alberth et al. | 345/156 |
| 2011/0142423 A1* | 6/2011 | Horibe et al. | 386/297 |

FOREIGN PATENT DOCUMENTS

| | | |
|---|---|---|
| JP | 2006-11758 | 1/2006 |
| JP | 2007-274494 | 10/2007 |
| JP | 2007-288430 | 11/2007 |
| JP | 2008-131413 | 6/2008 |
| JP | 2008-211318 | 9/2008 |
| JP | 2010-11403 | 1/2010 |

OTHER PUBLICATIONS

International Search Report of PCT/JP2010/057408 mailed May 25, 2010.

* cited by examiner

FIG. 9

| DATE | SUBJECT | SCREEN IMAGE | MOVING PICTURE | URL |
|---|---|---|---|---|
| 10/01 09:00 | START OF RENTAL OF DVD | C:/Disp1.jpg | — | — |
| 10/10 09:00 | NEW SALE OF WEEKLY MAGAZINE FMV | C:/Disp2.jpg | — | — |
| 10/20 09:00 | OPENING OF PC SHOW | C:/Disp3.jpg | C:/Movie1.mpg | www.pc.com |
| 10/30 09:00 | NEW SALE OF RAKURAKU MOBILE PHONE | C:/Disp4.jpg | C:/Movie2.mpg | — | ions
VIDEO DATA PROCESSING APPARATUS AND METHOD

CROSS-REFERENCE TO RELATED APPLICATION

This application is a continuation application of International Application PCT/JP2010/057408 filed on Apr. 27, 2010 and designated the U.S., the entire contents of which are incorporated herein by reference.

FIELD

A certain aspect of the embodiments discussed herein is related to a technology of processing video data.

BACKGROUND

A commercial video of a TV broadcast contains date and time information as the case may be. What can be exemplified is, for example, a date of selling a commercial article, a product provided by rental, a date of starting the rental of a real estate, a start date of screening a movie and a notice of a broadcasting schedule of a new program. If a user gets interested in the commercial video that is being broadcasted, for instance, a scene stop function such as an "on-screen note" button has been provided. When the "on-screen note" button is operated, the scene in the midst of broadcasting is stopped. The user has taken a note so far during the stop of the scene or performed a scene missing preventive function by starting up a schedule management application, e.g., conducted a date and time setting based on a function of giving notification of designation when reaching a designated date and time. Further, if the user has gotten interested in a content of the program that was in the midst of being played back during the playback of a recorded program, the user has stopped the scene with a "temporary stop" button and conducted the same setting.

[Patent document 1] Japanese Laid-Open Patent Publication No. 2006-011758

[Patent document 2] Japanese Laid-Open Patent Publication No. 2005-128659

[Patent document 3] Japanese Laid-Open Patent Publication No. 2003-331181

SUMMARY

According to an aspect of the embodiments, an information processing apparatus includes a display control unit to output a video to a display device on the basis of video data containing a plurality of picture frames; an operation unit to accept a user's operation, and a registering unit to extract date and time information from an operation target picture frame corresponding to the video that is output when accepting the operation and to register a schedule so as to output information contained in the video at a date and time of the extracted date and time information.

The object and advantages of the embodiment will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 9 is a diagram illustrating a data structure of a schedule database;

DESCRIPTION OF EMBODIMENTS

An information processing apparatus according to one embodiment will hereinafter be described with reference to the drawings. A configuration in the following embodiment is an exemplification, and the present information processing apparatus is not limited to the configuration in the embodiment.

The information processing apparatus determines a scene desired to be notified to a user or user's relevant persons through a user's operation. Then, the information processing apparatus extracts character data from an image of the determined scene, and acquires date and time information. Subsequently, the information processing apparatus registers the extracted date and time information and the image of the determined scene or information of partial moving picture containing this image by linking up these items of information with a database of a schedule management application program (which will hereinafter be simply termed a scheduler). The user's operation for determining the scene is executed by a click operation which involves using, e.g., a pointing device. Accordingly, the user can register various items of information useful to the user without it being time-consuming. The scheduler reproduces the image of the registered scene or the registered partial moving picture according to the registered date and time information. Hence, the user makes the scheduler output the useful information from the information processing apparatus at the date and time indicated by the scene, and can take a measure corresponding to this information.

Herein, the scene corresponds to the partial moving picture or one picture frame in the video. For example, in Moving Picture Experts Group (MPEG), the data is processed on the unit of plural picture frames called Group Of Pictures (GOP). In the embodiment, the partial moving picture contains one or a plurality of GOPs. Note that the partial moving picture such as this is distinguished from other partial moving pictures in terms of the unit referred to as a chapter. Namely, in the embodiment, the chapter connotes an aggregation of moving pictures containing one or the plurality of GOPs. In the MPEG, each individual picture frame is compressed within the GOP, and hence, before manipulating the individual picture frame of the GOP, a restoration process may be temporarily executed. With respect to an Intra coded picture (I-picture) in the GOP, however, similarly to Joint Photographic Experts Group (JPEG), the data within one picture frame is compressed and can be processed without the restoration process on a per GOP basis.

Figure 1:
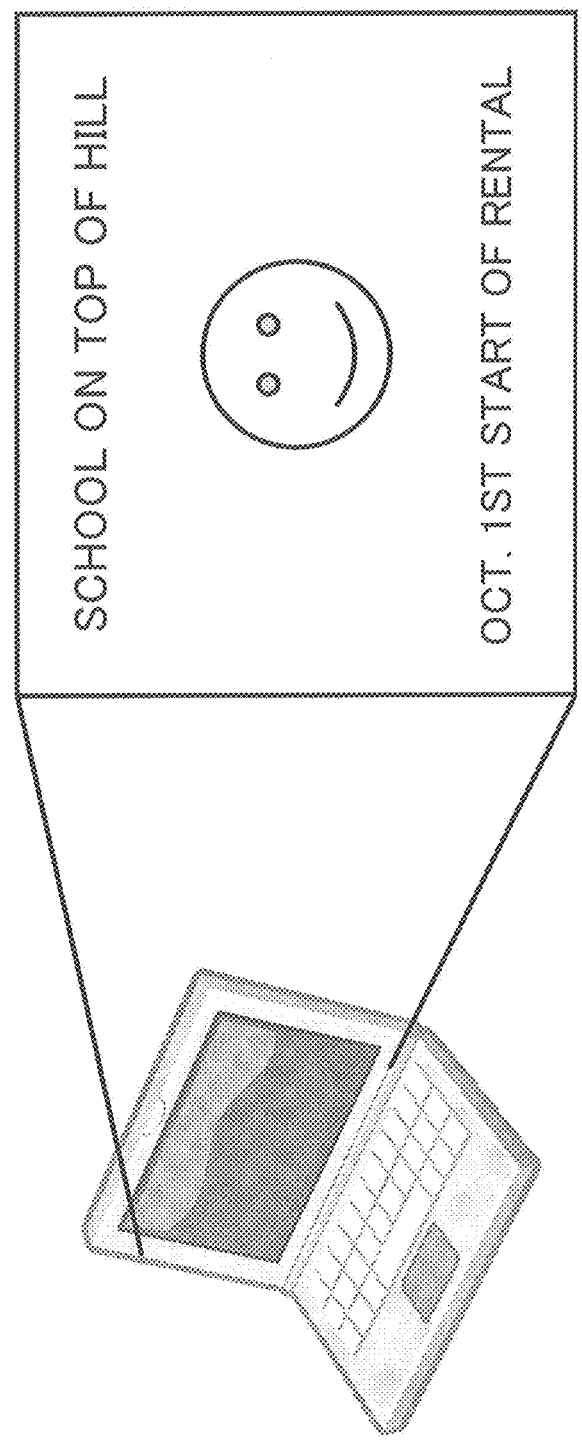
FIG. 1 is a view illustrating a screen for viewing a TV broadcast.

FIG. 1 illustrates a screen on which the user is in the midst of viewing a TV broadcast (e.g., Moving Picture Experts Group phase 2 (MPEG-2), Moving Picture Experts Group phase 4 (MPEG-4)). If there is a scene in which the user gets interested during the viewing, the user performs an operation for determining the scene on the screen by an operation unit such as a pointing device like a keyboard, a mouse, etc, and a remote controller. Thereupon, a television application program (which will hereinafter be simply referred to as the TV application program) in the execution underway on the information processing apparatus gets the scene determined based on the picture frame, the GOP, the chapter, etc displayed at the point of time when the user operates. Accordingly, the scene can be defined as one picture frame contained in the moving pictures or the aggregation of the plural picture frames.

Figure 2:
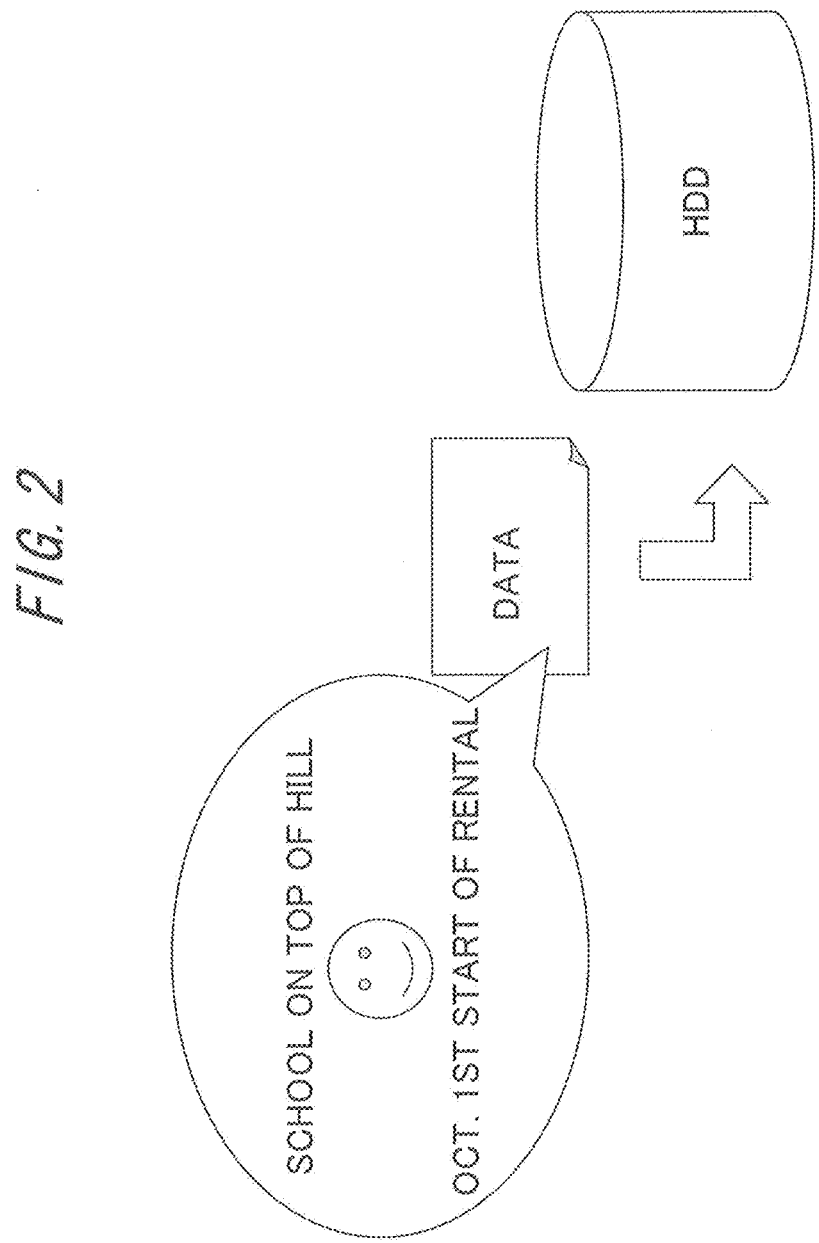
FIG. 2 is a view illustrating a process of saving a picture acquired from a scene of the TV broadcast in an external storage device.

The determined scene is handed over to an analysis engine within the information processing apparatus. The information processing apparatus serving as the analysis engine executes a computer program deployed on a main storage unit in an executable manner. The analysis engine converts, as in FIG. 2, the determined scene into a picture based on Joint Photographic Experts Group (JPEG) and saves the picture on an external storage device such as a hard disk.

Figure 3:
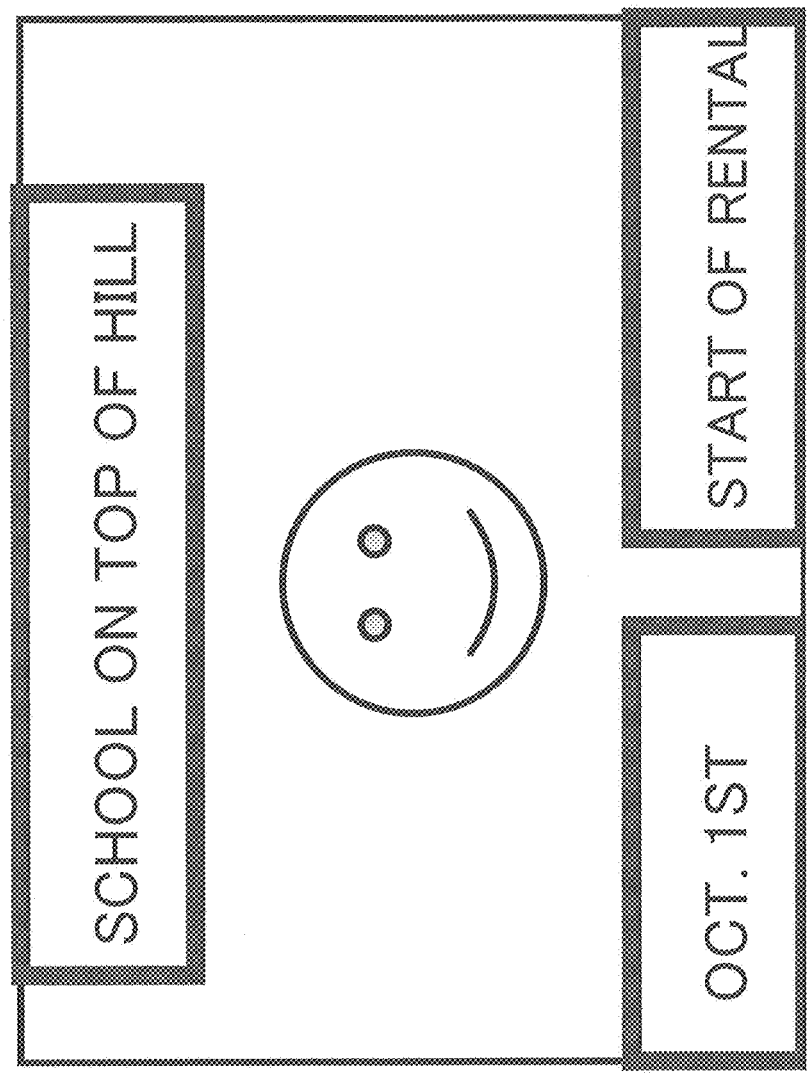
FIG. 3 is a view illustrating an example of the saved picture.

FIG. 3 illustrates an example of the saved picture. The example of FIG. 3 includes a picture titled "SCHOOL ON TOP OF HILL", dated information "OCT. 1ST" and a character string such as "START OF RENTAL". Next, the analysis engine extracts the character data as text data from the saved picture as in FIG. 3 by use of an existing character extraction technology.

Figure 4:
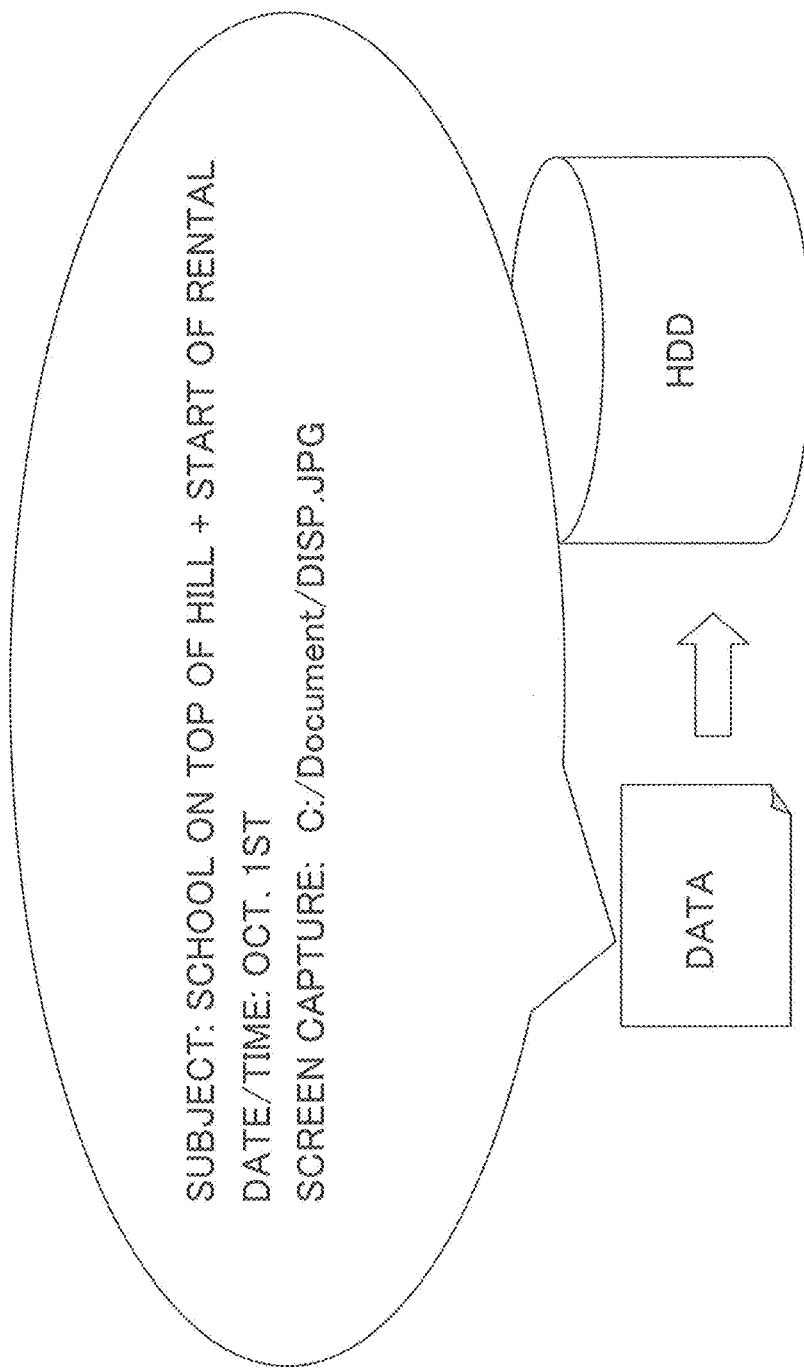
FIG. 4 is a view depicting a process of registering a schedule in a scheduler on the basis of date and time information.

Furthermore, the analysis engine determines from an arrangement of the text data as in FIG. 4 whether the data is the date and time information or not, and, after segmenting the text data, registers a schedule in the scheduler (reference to FIG. 9 with respect to an example of a database structure of the scheduler). Acquired in the example of FIG. 4 is a subject including the character data other than the date and time information, such as the picture titled "SCHOOL ON TOP OF HILL" and the character data "START OF RENTAL".

Further, "OCT. 1ST" is acquired as the date and time information. Moreover, there is retained a name of folder stored with the picture, i.e., a name of path containing directory information and the file name on the external storage device etc.

Figure 5:
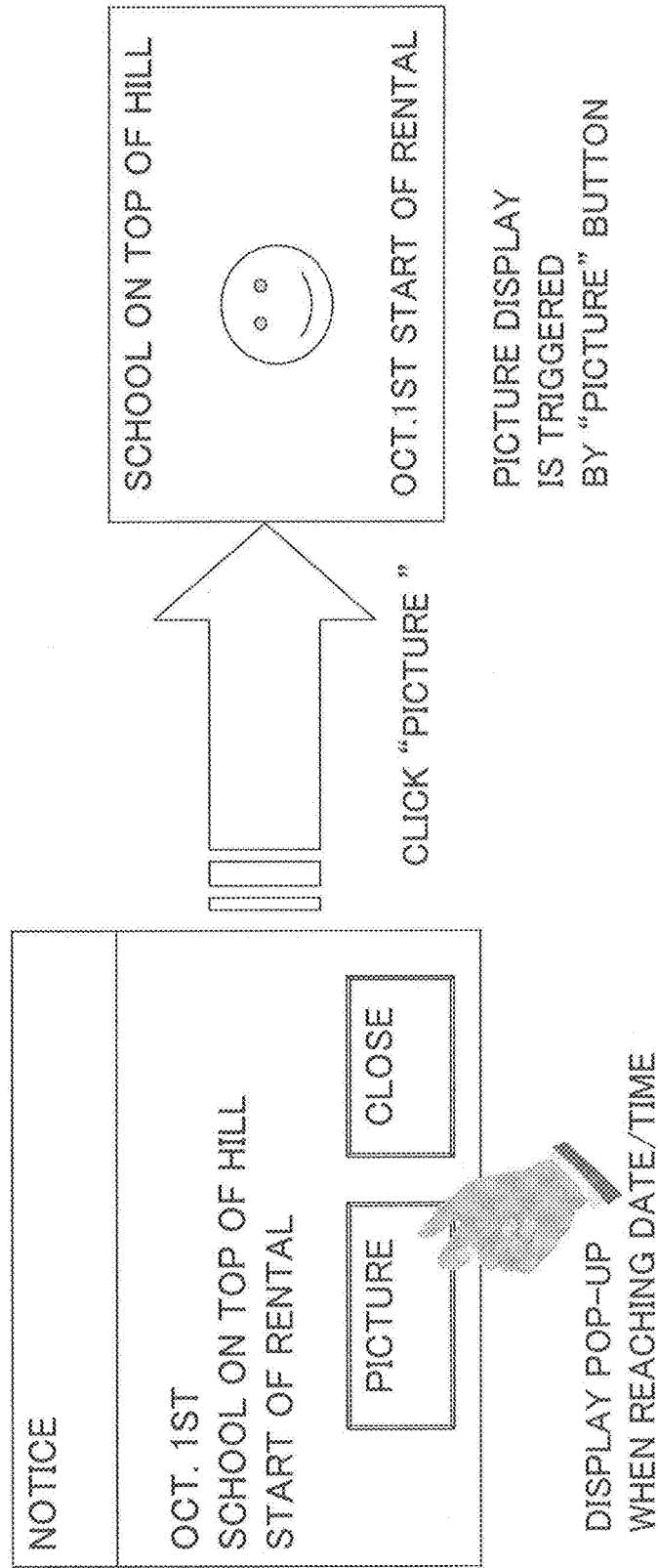
FIG. 5 is a view depicting a process of notifying a user that it reaches a designated time by displaying a pop-up window.

The scheduler periodically refers to the database and thus checks whether the schedule is registered or not. If the schedule is registered, the scheduler compares the specified time of the registered schedule with the present time on the information processing apparatus. Then, when reaching the specified date and time, the scheduler acquires the related picture out of the external storage device, and notifies the user of having reached the specified time through pop-up display as in FIGS. 5 and 8. In the example of FIG. 5, the date and time information "OCT. 1ST" and the subject "SCHOOL ON TOP OF HILL START OF RENTAL", a "PICTURE" button and a "CLOSE" button are displayed on the pop-up screen displayed at the specified date and time. When the user operates the "PICTURE" button, the picture of the stored scene is displayed. Further, when the user operates the "CLOSE" button, the pop-up screen is closed. Accordingly, through the operation of selecting the scene in which the user gets interested, there are performed the acquisition of the scene, the analysis thereof, the storage of the analysis result and the registration in the scheduler at the date and time based on the analysis result. Then, the scheduler displays the stored analysis result information and the picture of the scene at the date and time registered in the scheduler. Accordingly, the user can register various categories of notice information contained in the picture such as a prospective event, a sale of a commercial product and the start of rental in the scheduler.

<First Embodiment>

Figure 6:
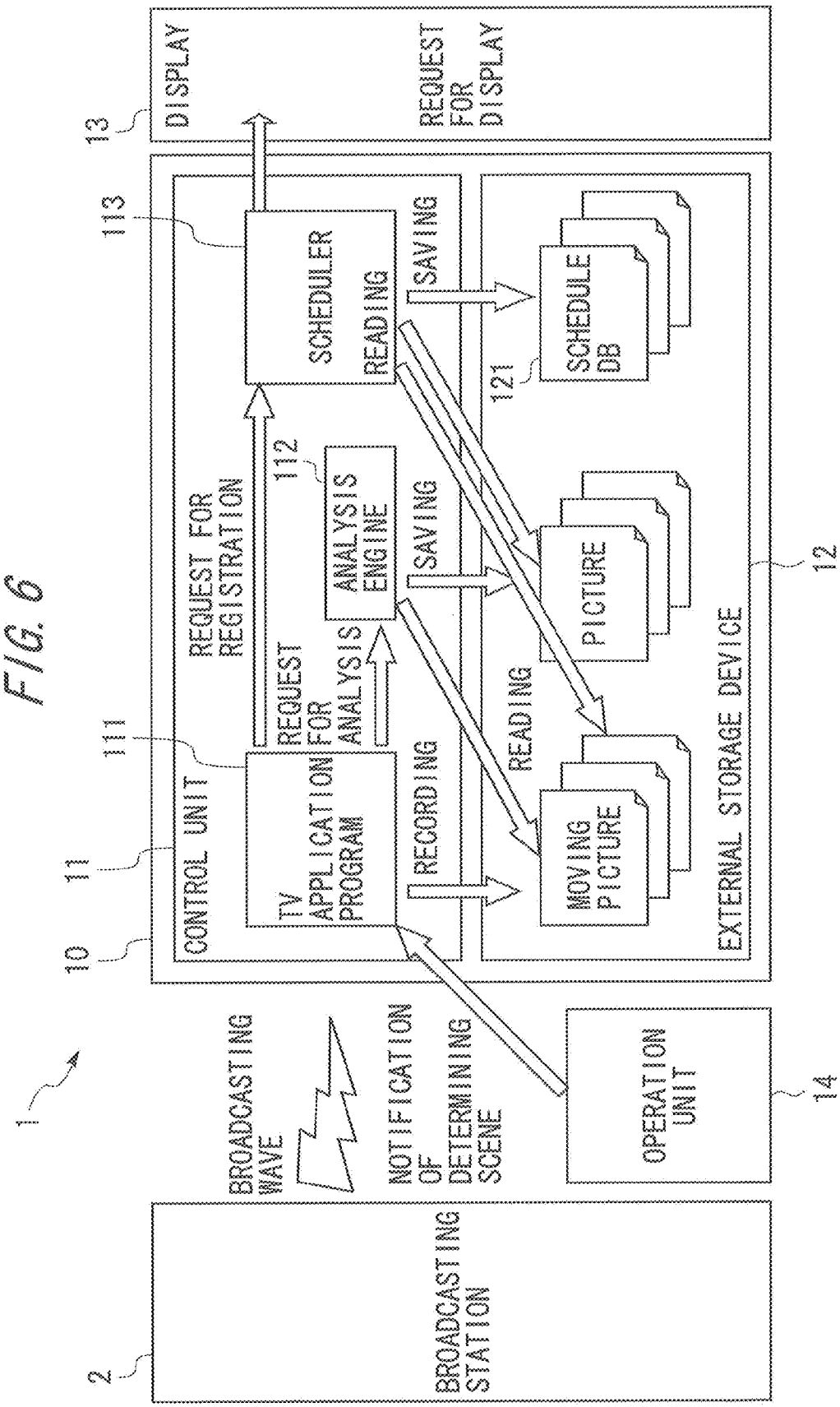
FIG. 6 is a diagram illustrating an information processing apparatus according to a first embodiment and a flow of information processed by the information processing apparatus.

An information processing apparatus 1 according to a first embodiment will hereinafter be described with reference to FIGS. 6 through 11. FIG. 6 is a diagram illustrating the information processing apparatus 1 according to the first embodiment and a flow of the information processed by the information processing apparatus 1. As in FIG. 6, the information processing apparatus 1 receives broadcast waves from a broadcasting station 2 and thus acquires a video. Accordingly, in the first embodiment, the video includes, e.g., the moving pictures, voices or sounds of a TV program. Further, the information processing apparatus 1 is exemplified such as a personal computer, a personal digital assistant (PDA), an on-vehicle device, a digital television, a hard disk recorder and a recorder for a removable medium. The removable medium is exemplified such as Blu-ray disc and a Digital Versatile Disk (DVD).

As in FIG. 6, the information processing apparatus 1 includes a main body 10, a display 13 and an operation unit 14. The main body 10 is a housing of the personal computer etc. The main body 10 may, however, be a set-top box etc for, e.g., satellite broadcasting, digital TV broadcasting and cable TV broadcasting. The main body 10 includes a control unit 11 and an external storage device 12.

Figure 7:
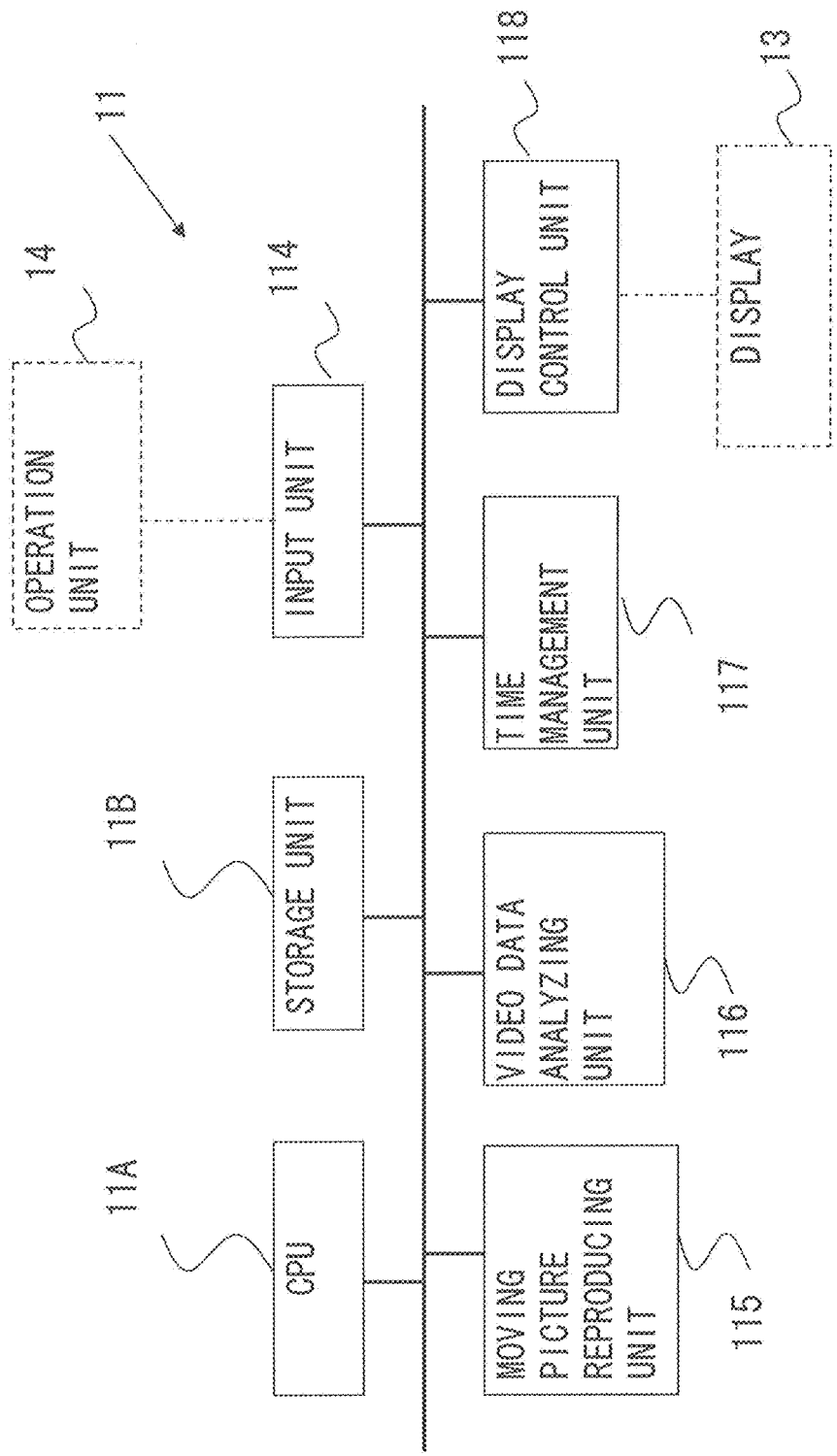
FIG. 7 is a diagram illustrating details of a control unit.

FIG. 7 depicts details of the control unit 11. The control unit 11 includes a CPU 11A, a main storage unit 11B, an input unit 114, a moving picture reproducing unit 115, a video data analyzing unit 116, a time management unit 117 and a display control unit 118.

The CPU 11A executes the computer program deployed on the main storage unit 11B in the executable manner, thereby providing a function as the information processing apparatus. FIG. 7 illustrates the single CPU 11A, however, the CPU 11A may include a plurality of CPU chips. Further, the CPU 11A may also be a multi-core processor including a plurality of CPU cores inside.

The main storage unit 11B retains the computer program executed by the CPU 11A or data etc, which are processed by the CPU 11A. The main storage unit 11B includes a Dynamic Random Access Memory (DRAM) and a Read Only Memory (ROM). In these memories, the ROM may be stored with a basic program that is executed first when booting, e.g., the information processing apparatus 1. The basic program is, e.g., a Basic Input Output System (BIOS) etc of the personal computer.

The input unit 114 is exemplified as an interface which establishes a connection with the operation unit 14 and a driver program which controls the interface. The input unit 114 transfers the user's operation detected by the operation unit 114 to the CPU 11A.

The moving picture reproducing unit 115 includes processing circuit for MPEG-2, MPEG-4, MPEG-1 Audio Layer III (MP3), etc. The moving picture reproducing unit 115 converts the moving picture data, the voice data and the sound data each received from the broadcast waves into an expanded format from a compressed format, and thus reproduces the data. The moving pictures reproduced by the moving picture reproducing unit 115 are output to the display 13 via the display control unit 118.

The video data analyzing unit 116 can be exemplified as a processor which executes image processes such as template matching, differentiation, integration and filter processing. The video data analyzing unit 116 is used when acquiring the date and time information, the character data, etc from the scene in the video.

The time management unit 117 retains the time information within the information processing apparatus 1, and provides the time information to the program via the application interface. The time management unit 117 is, e.g., a date and time function of an Operating System (OS). The display control unit 118 can be exemplified as an image output circuit including an interface which establishes a connection with the display 13, a graphic processor, and so on. The display control unit 118 outputs, to the display 13, the moving pictures reproduced by the moving picture reproducing unit 115, or the data and messages that are processed by the control unit 11 or a window or a screen generated by the control unit 11.

Referring back to FIG. 6, the description will continue. The control unit 11 receives the broadcast waves, records the received video, requests an analysis engine 112 to make an analysis, and executes a schedule registration process with respect to a scheduler 113 on the basis of a TV application program 111. Though omitted in FIG. 6, the main body 10 has an antenna and a receiving circuit for receiving the broadcast. The receiving circuit receives the broadcast from the antenna and generates a video of the broadcast program. The video of the broadcast program is handed over to the TV application program 111 of the control unit 11.

Furthermore, the control unit 11 executes the computer program, thereby providing the function as the analysis engine 112. For instance, the analysis engine 112 receives the partial moving picture, e.g., one chapter, the GOP or the plurality of GOPs of the video of the TV program from the TV application program 111. Then, the analysis engine 112 starts up the video data analyzing unit 116, thereby extracting the date and time information, the character data, etc from the picture frames contained in the partial moving picture. The analysis engine 112 registers the schedule in the scheduler 113 at the date and time of the acquired date and time information. The analysis engine 112 corresponds to a registering unit.

A procedure of acquiring the date and time information and the character data from the picture frames is broadly known, and hence its details are omitted. For example, vectors of characteristic quantities at a plurality of dimensions are extracted by thinning lines of the characters and combining gradients of the thin lines. Then, the characters with coincidence of the vectors of the characteristic quantities may be aggregated, and the template matching may be carried out.

Furthermore, there is also known a structure analytical method, i.e., a method of estimating an associative character by analyzing a structure of the character with a number of closed loops and a number of endpoints from a shape of the character.

Moreover, the control unit 11 executes the computer program, thereby providing a function as the scheduler 113. For example, the scheduler 113 starts up the process set at the set time. The process started up by the scheduler 113 is, e.g., the process of displaying the specified information, image, etc. The set time and the set process are registered in a schedule database 121 within the external storage device 12. The scheduler 113 corresponds to a schedule management unit.

The external storage device 12 is, e.g., the hard disk drive etc. The external storage device 12 retains the moving picture data, the image data of static images etc, the schedule database 121, etc. The external storage device 12 or the main storage unit 11B corresponds to a recording unit.

The display 13 is, e.g., a liquid crystal display, an electroluminescence panel, etc. The display 13 displays the moving pictures, the static images, the text messages, etc under the control of the control unit 11. The display 13 corresponds to a display device.

The operation unit 14 is an input device such as a keyboard, a mouse, a touch panel and an electrostatic pad. The electrostatic pad is a device used for controlling a position and a moving state of a cursor on the display 13 in a way that corresponds to the user's operation by detecting the user's operation to trace the flat pad with a finger etc. For example, a motion of the finger of the user is detected from variations in electrostatic capacity of an electrode under the flat pad.

Figure 8:
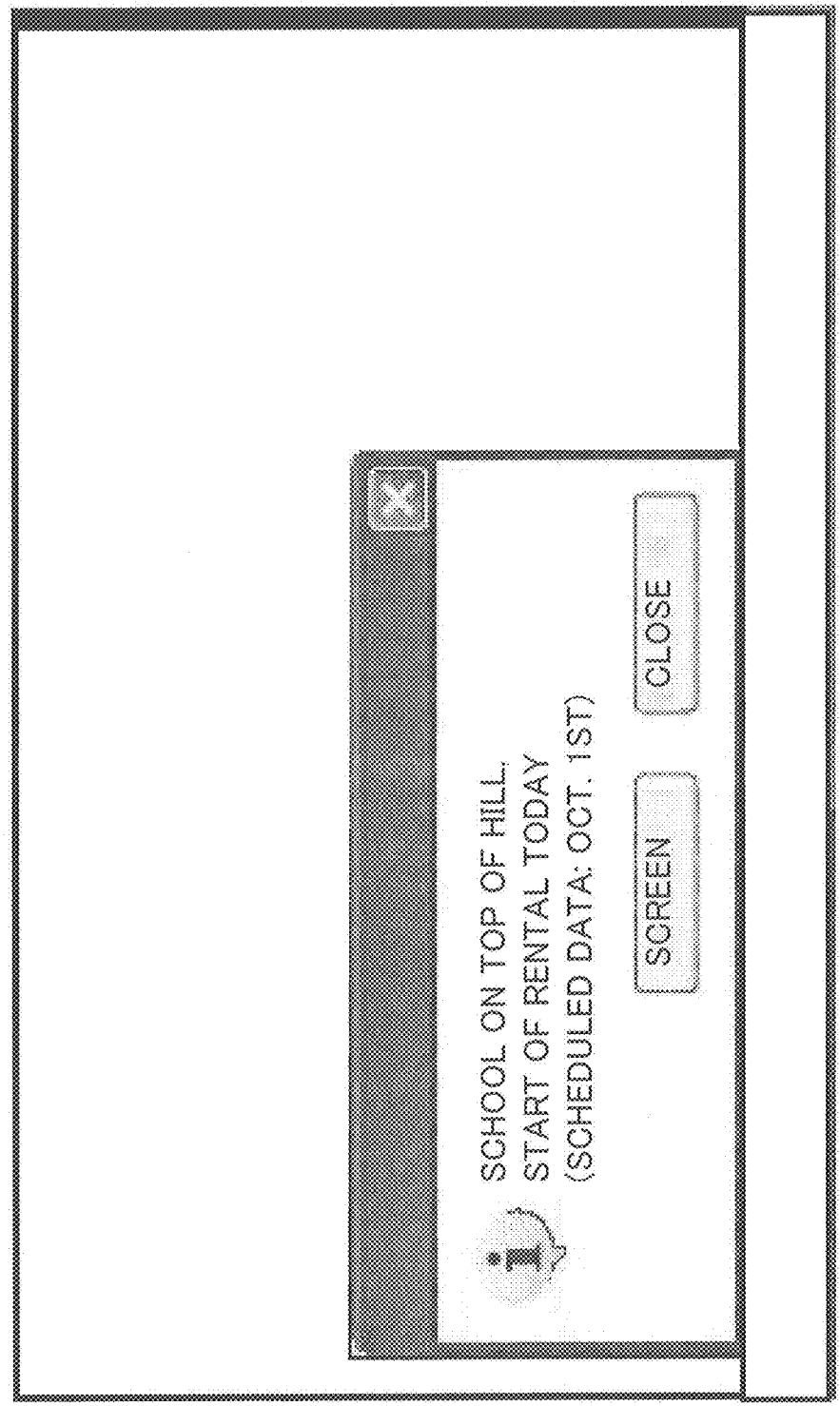
FIG. 8 is a diagram illustrating a message screen.

FIG. 8 depicts an example of a message screen displayed by the scheduler 113 at the specified date and time. A message such as "SCHOOL ON TOP OF HILL START OF RENTAL TODAY (SCHEDULED DATE: OCT. 1ST)" is displayed based on the character strings "SCHOOL ON TOP OF HILL", "START OF RENTAL" and the dated information "OCT. 1ST", which are acquired from the scene of the moving pictures. Further, the message screen is provided with a "SCREEN" button and a "CLOSE" button.

FIG. 9 illustrates a data structure of the schedule database 121 managed by the scheduler 113. In FIG. 9, the data structure is depicted in a table format. The uppermost row is, however, a descriptive line, and each of the rows from the second row downward corresponds to a record of the schedule database 121.

As in FIG. 9, the record of the schedule database 121 has a "DATE" field, a "SUBJECT" field, a "SCREEN IMAGE" field, a "MOVING PICTURE" field and a "URL" field. The "DATE" field is stored with the date and time information extracted from the scene, e.g., the picture frame, the GOP or one chapter. The "SUBJECT" field is stored with a character string other than the date and time information extracted from the scene.

The "SCREEN IMAGE" field retains a setting of a data storage location file path name of the screen image, e.g., one picture frame extracted from the scene. The screen image is used as a pop-up image displayed to the user at, e.g., a predetermined point of time. At first, however, the message screen illustrated in FIG. 8 is displayed, and the "SCREEN" button is selected, at which time the picture frame stored together with the path name set in the "SCREEN IMAGE" field may also be displayed.

The "MOVING PICTURE" field retains a setting of a storage location file path name of the chapter or the GOP corresponding to the scene. The "URL" field is stored with a Uniform Resource Locator (URL) extracted from the scene.

It maybe considered that the URL extracted from the scene contains detailed information related to the scene.

Figure 10:
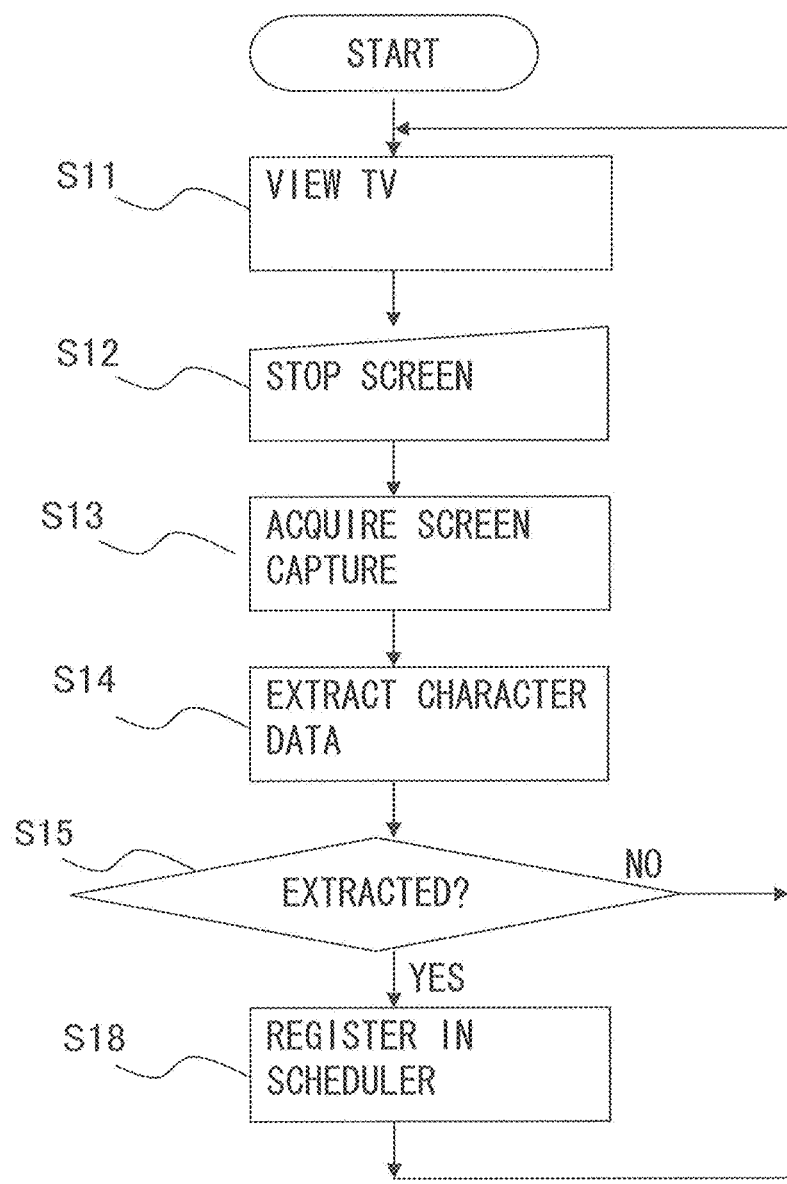
FIG. 10 is a flowchart illustrating a process of acquiring character data from a scene and registering the data in the scheduler.
Figure 11:
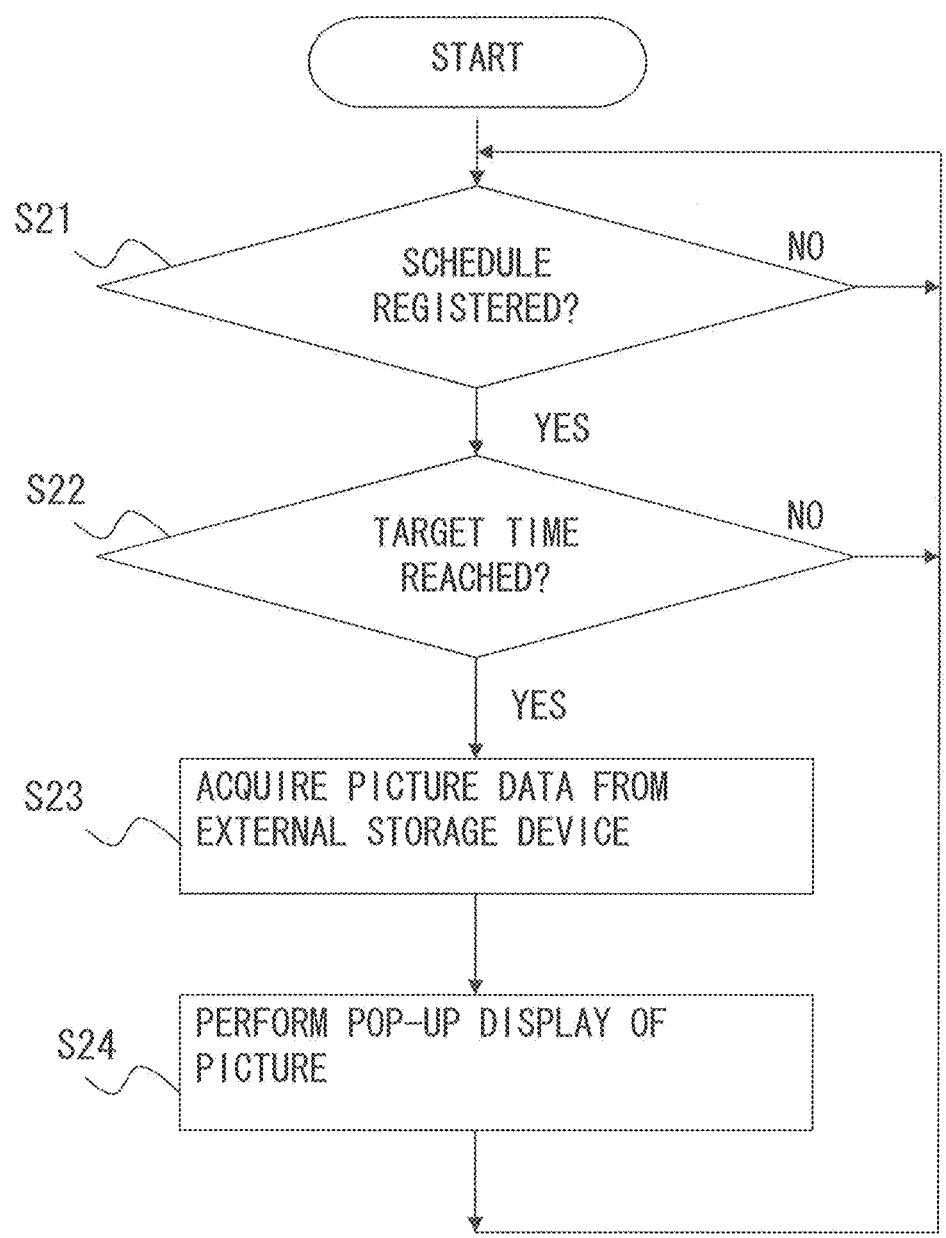
FIG. 11 is a flowchart illustrating a process of the scheduler.

FIGS. 10 and 11 illustrate flowcharts of the processes of the information processing apparatus 1 in the first embodiment. The CPU 11A of the control unit 11 executes the processes in FIGS. 10 and 11 according to the computer program deployed on the main storage unit 11B in the executable manner. The discussion will hereinafter be made on the assumption that the control unit 11 executes the processes.

FIG. 10 is a flowchart illustrating a process of acquiring the character data from the scene and registering the data in the scheduler 13. In this process, the user views the TV by use of, e.g., the function of the information processing apparatus 1 (S11). When an interceding video is displayed during the TV viewing, the user executes the operation to stop the screen by the operation unit 14. Thereupon, the control unit 11 detects the user's operation to stop the screen via the operation unit 14 (S12).

Upon detecting the operation to stop the screen, the control unit 11 acquires the GOP corresponding to the scene displayed when the operation to stop the screen is detected from the moving picture reproducing unit 115. Then, the control unit 11 acquires one picture frame contained in the GOP and retains this picture frame as a screen capture in the main storage unit 11B (S13). The screen-captured picture frame will hereinafter be simply termed the screen capture. As the screen capture, for instance, the picture frame being reproduced when detecting the operation to stop the screen in the picture frames within the GOP may be specified and reproduced. More simply, however, the picture (image) corresponding to the I-picture in the MPEG may also be acquired as the screen capture. The control unit 11 serving as the analysis engine 112 will hereinafter execute the processes in S13 through S16.

Next, the control unit 11 extracts the character data from the screen capture by use of the video data analyzing unit 116 (S14). A character data extraction procedure is not particularly limited. For example, in the picture, a character data portion (data frame) may be considered to be larger in variation of density (density of pixels) than the picture other than the characters. Such being the case, to begin with, the control unit 11 smoothens the screen capture to eliminate noises. Then, the control unit 11 determines a portion where the variation in density per reference length exceeds a reference variation value within the screen capture after eliminating the noises. Note that an edge enhancement process may be executed by space differentiation etc of the picture after eliminating the noises.

Then, the control unit 11 may presume, as the character data portion, a region where a predetermined or greater number of portions of which the variation in density per reference length exceeds the reference variation value exist per unit area. For example, if the density varies in a dot-shape, the number of dotted portions may be calculated. Further, if the density varies in a curvilinear shape, the region is segmented at the curved portions, and the number of portions where the variation in density exceeds the reference variation value may be counted. Still further, if the density varies linearly, the region is segmented by a unit section in a linear direction, and the number of these segments may be calculated. Namely, if the density varies linearly, the number of portions where the variation in density exceeds the reference variation value may be counted on the assumption that a plurality of dotted-variations in density is aggregated.

Then, the control unit 11 may apply a known character recognition algorithm to the presumed character data portion. This type of character recognition algorithm has already been broadly utilized for an Optical Code Reader (OCR) or a handwriting character recognition tool, etc.

For instance, in the Information Processing Society of Japan Transactions on "High Speed Character Recognition Algorithm Using Associative Matching Technique", Sun Ning et al., Vol. 3, No. 3, pp. 404-413, issued on Mar. 15, 1991, the region of the character data portion is segmented into a plurality of partial regions, the direction of the line segment within the segmented partial region is described by 4-dimensional vectors, and the characteristic quantity of the character data portion is calculated. Then, such a method is demonstrated that the character is recognized by associating the calculated characteristic quantity with the character. Note that these characteristic quantities are associated with a plurality of character groups, and the template matching may be executed in each character group.

Next, the control unit 11 determines whether the character data can be extracted or not (S15). If the character data cannot be extracted, the control unit 11 finishes processing. Note that if the character data cannot be extracted, the control unit 11 may display, on the screen, a message saying that the character data cannot be extracted.

Whereas if the character data can be extracted, the control unit 11 registers, in the schedule, a notifying process for calling for an attention of the user by employing the date and time information in the extracted character data (S18). Herein, the notifying process is, e.g., a process of displaying, on the display 13, a predetermined message to the user at the date and time of the extracted date and time information. Accordingly, in the process of S18, the respective fields are set in the schedule database 121 depicted in FIG. 9. Moreover, in the process of S18, the picture data corresponding to the screen image is stored in the external storage device 12. The picture data corresponding to the screen image may be the screen capture itself. Further, the picture data corresponding to the screen image may be the picture data processed so as to enlarge, e.g., the character data portion.

FIG. 11 is a flowchart illustrating the processes of the scheduler 113. The control unit 11 starts up the computer program deployed on the main storage unit 11B in the executable manner at a predetermined interval. Then, the control unit 11 serving as the scheduler 113 executes the processes in FIG. 11. The scheduler 113 determines whether the schedule is registered in the schedule database 121 or not (S21). If the schedule is not registered in the schedule database 121, the scheduler 113 finishes processing directly.

Whereas if the schedule is registered in the schedule database 121, the scheduler 113 determines whether or not the present time reaches a target time set in each schedule (S22). For example, the scheduler 113 reads the schedules registered in the schedule database 121 in a set target time sequence, and determines whether the target time approaches the present time or not. For instance, when a time difference between the target time and the present time comes to within the startup interval of the scheduler 113, it may be determined that the present time reaches the target time set in each schedule.

Then, if the present time does not reach the target time set in each schedule, the scheduler 113 may finish processing directly. Further, whereas if the present time reaches the target time set in each schedule, the scheduler 113 acquires the file path name of the screen image to be displayed from the schedule database 121. Subsequently, the relevant picture data is acquired from the external storage device 12 on the basis of the acquired file path name (S23). This picture data may be, e.g., the screen capture itself. Moreover, the picture data may also be what the screen capture is summarized, e.g., the picture data processed so as to enlarge the character data portion. Then, the scheduler 113 displays the picture in a pop-up window on the display 13 (S24).

Though omitted in the process of S24, however, the scheduler 113 may, at first, display the message screen containing the subject (see FIG. 9) and the date and time information as depicted in FIG. 8. Then, when the user gives an instruction to display the screen with the "SCREEN" button, the scheduler 113 may display the screen capture.

As described above, the information processing apparatus 1 detects an operation indicating a user's intension such as the screen stop performed via the operation unit 14 with respect to the picture in which the user gets interested, and acquires the screen capture. Then, the information processing apparatus 1 extracts the character data from the screen capture and, if the character data contains the date and time information, displays the screen data at the date and time specified by the date and time information. Accordingly, e.g., if the user recognizes the date and time when an interesting event is performed, a notice of an interesting TV program, a notice of a movie, a theatrical performance or a concert, a sale of a content such as a DVD, a start of the rental and a sale of a book in the TV program, a call-for-attention process in the pop-up window can be extremely easily registered in the scheduler 113. The user may simply execute the operation implying that the user has the interest, e.g., via the operation unit 14. Accordingly, the user is released from a schedule registration process, an on-screen note making process, etc, which are all time-consuming, whereby a possibility of causing mistakes in operation and in input can be reduced.

Note that the registration in the scheduler 113 may be done so that the user can specify the dates/times before and after the date and time of the date and time information extracted from the scene. For example, an available setting is that a preparative period such as a previous day, 3 days before and one week before the extracted date and time can be specified beforehand. The schedule may be registered in the scheduler 113 at the date and time before the preset preparative period with respect to the extracted date and time. Alternatively, when registered in the scheduler 113, the control unit 11 may inquire of the user via the display 13 about how long the preparative period is set.

<Second Embodiment>

The information processing apparatus 1 according to a second embodiment will be described with reference to FIGS. 12 and 13. In the first embodiment, the information processing apparatus 1 detects the operation conducted via the operation unit 14 with respect to the picture in which the user gets interested. Then, the information processing apparatus 1 registers the schedule so as to execute the notifying process by displaying the picture data, e.g., the screen capture to the user at the date and time acquired from the video.

While on the other hand, in the second embodiment, the information processing apparatus 1 executes the notifying process by saving the moving pictures containing the scene in place of the picture data such as the screen capture and displaying the moving pictures to the user at the date and time acquired from the video. Other configurations and operations in the second embodiment are the same as those in the first embodiment. Such being the case, the same components as those in the first embodiment are marked with the same numerals and symbols, and their descriptions are omitted. Moreover, the drawings in FIGS. 1-11 are applied also to the second embodiment as the necessity arises.

Figure 12:
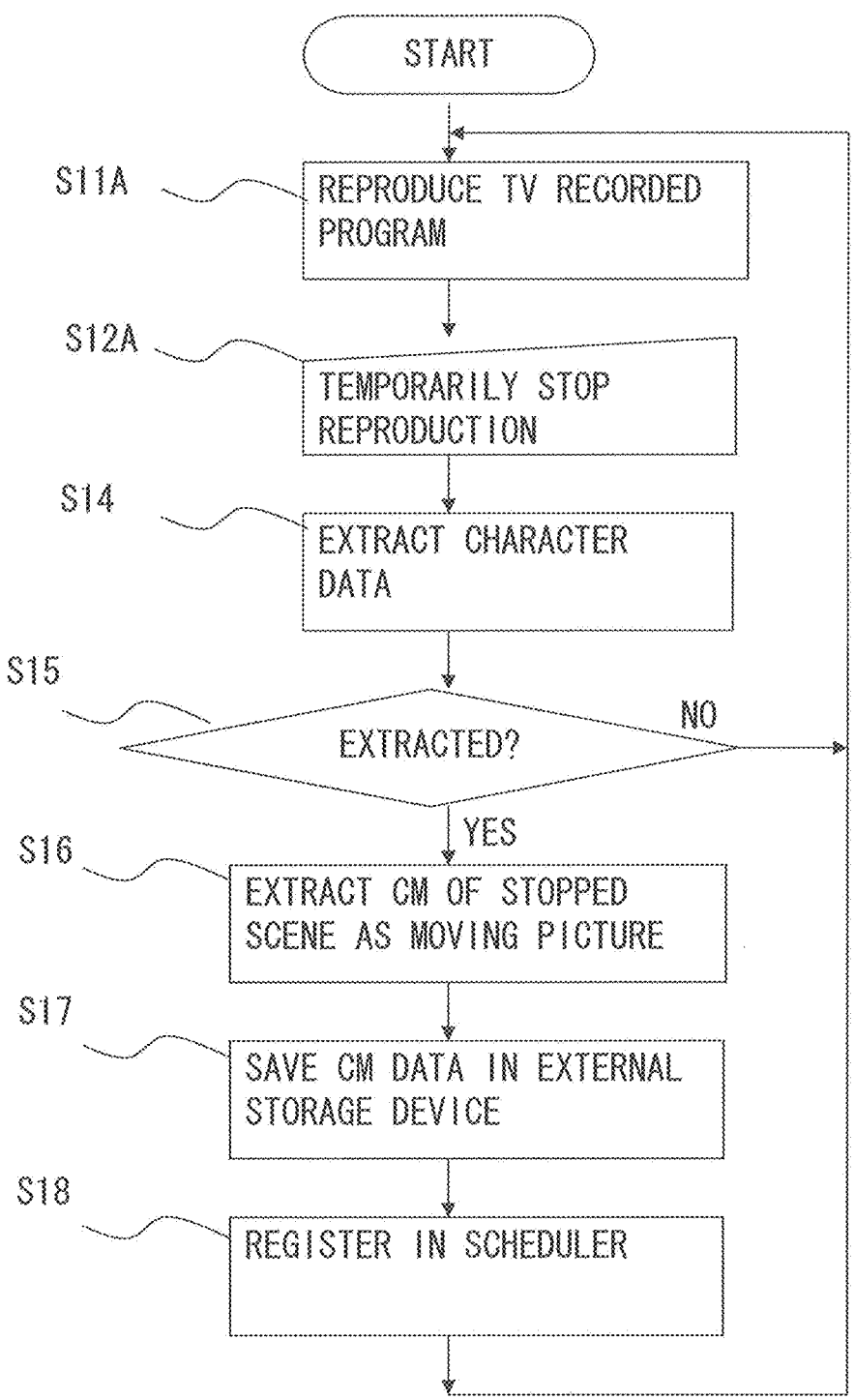
FIG. 12 is a flowchart illustrating a process of extracting the character data from a TV recorded program and registering the data in the scheduler so as to execute a notifying process based on a moving picture.

FIG. 12 is a flowchart illustrating a process of extracting the character data from a TV recorded program and registering the schedule so as to execute the notifying process based on the moving pictures. In this process, the user views the TV recorded program by use of, e.g., the function of the information processing apparatus 1 (S11A). If an interesting video is displayed to the user during the viewing of the recorded program, the user carries out the operation of temporarily stopping the playback through the operation unit 14. Thereupon, the control unit 11 detects the playback temporary stop operation of the user via the operation unit 14 (S12A).

Upon detecting the screen stop operation, the control unit 11 makes the moving picture reproducing unit 115 acquire the GOP corresponding to the scene being displayed when detecting the screen stop operation. Then, the character data is extracted from the picture frame contained in the GOP (S14). Details of the character data extraction process are the same as in the first embodiment.

Next, the control unit 11 determines whether the character data can be extracted or not (S15). If character data cannot be extracted, the control unit 11 finishes processing. Whereas if the character data can be extracted, the control unit 11 extracts, as the moving picture, a commercial portion (commercial picture frame) contained in the scene that is temporarily stopped in S12A (S16). The commercial portion may involve using the GOP and the chapter of the portion that is temporarily stopped by the user. Namely, the processes of the information processing apparatus 1 may be executed on the premise that what the user performs the temporary stop operation in S12A is the commercial portion. Further, if the portion that is temporarily stopped is not previously determined to be the commercial portion, for instance, the determination may be made based on whether or not the character string extracted from within the picture data contains a name of the commercial product, a name of the commercial product provider organization, a name of the service, a name of the service provider organization, etc. Moreover, a voice recognition process is executed with respect to the voice that is output together with the video, and the determination may be made based on whether or not the voice in the temporarily stopped video contains the name of the commercial product, the name of the commercial product provider organization, the name of the service, the name of the service provider organization, etc. Words, phrases, the name of the commercial product, the name of the commercial product provider organization, the name of the service, the name of the service provider organization, etc, which have a high possibility of being contained in the commercial, may be registered beforehand in a master file of the external storage device 12. As the words having the high possibility of being contained in the commercial such as "new sale", "reservation", "subscription", "good reputation", "price-cut" and "telephone number", the terms related to an event, a price, a quality, a feature and a contact address pertaining to the commercial product may be registered in the master file.

Then, for example, if the temporarily stopped scene in S12A does not contain the words, the phrases, the name of the commercial product, the name of the commercial product provider organization, the name of the service, the name of the service provider organization, etc, which have the high possibility of being contained in the commercial, the control unit 11 searches for the GOPs or the chapters before and after the temporarily stopped scene.

Then, the control unit 11 saves the moving picture of the commercial portion extracted in S16 in the external storage device 12 (S17). Subsequently, the control unit 11 registers, in the schedule, the notifying process for calling for the attention of the user by employing the date and time information in the extracted character data (S18).

Figure 13:
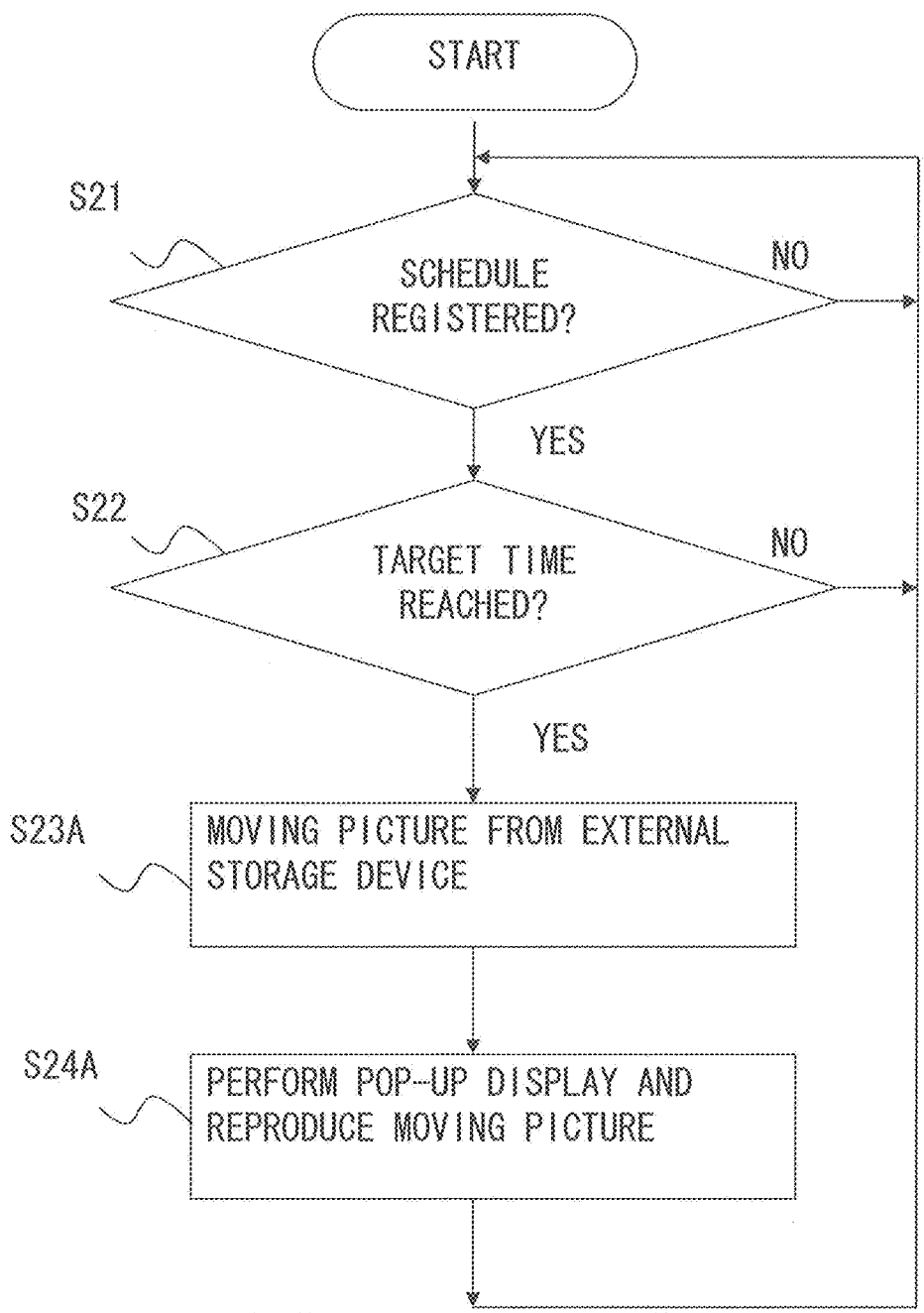
FIG. 13 is a flowchart illustrating a process of the scheduler.

FIG. 13 is a flowchart illustrating the process of the scheduler 113. The processes in S21 and S22 of FIG. 13 are the same as those in FIG. 11, and hence their descriptions are omitted. In the second embodiment, the scheduler 113, when reaching the target time, acquires the relevant moving picture data from the external storage device 12 (S23A). Then, the control unit 11 displays the pop-up screen, and plays back the acquired moving picture data, i.e., the moving pictures of the commercial portion (S24A).

As described above, in the second embodiment, the information processing apparatus 1, when giving the instruction to temporarily stop the recording program that is in the midst of being played back by use of the operation unit 14, extracts the character data from the temporarily stopped scene. Moreover, the moving picture of the commercial portion is acquired from the temporarily stopped scene or from the vicinity of this scene. Then, the schedule is registered in the scheduler 113 so that the moving picture is played back at the date and time of the date and time information contained in the extracted character data. Accordingly, during the commercial, the user can display or reproduce the commercial at the output date and time with the extremely simple operation. That is, the user can view again the commercial at the date and time that is output in the commercial. Accordingly, if the commercial contents are the date and time when the interesting event is performed, the notice of the interesting TV program, the notice of the movie, the theatrical performance or the concert, the sale of the content such as the DVD, the start of the rental and the sale of the book, it is feasible to view again the commercial at the date and time close to the date and time of the performance.

Note that the second embodiment has discussed the example in which the user temporarily stops the TV program when reproducing the already-recorded TV program. For example, similarly to the first embodiment, however, even during the viewing of the TV program, if the information processing apparatus 1 includes the main storage unit 11B or the external storage device 12 each having a sufficient capacity, the same processes as those in the second embodiment can be executed by saving the program that the user is in the midst of viewing for a predetermined period of time. For instance, the external storage device 12 may be provided with a storage area of a ring buffer for retaining the video for the predetermined period after the user has viewed.

In the processes of the second embodiment, it follows that the moving pictures are played back according to the schedule registered in the schedule database 121. In this case, the way of displaying the moving pictures may involve starting up a moving picture display program according to the schedule. Further, the moving pictures may be displayed by use of the moving picture display program resident in the computer. In the case of using the resident moving picture display program, it follows that the display of the moving pictures is executed in parallel with other processes and other displays on the computer.

<Third Embodiment>

The information processing apparatus 1 according to a third embodiment will hereinafter be described with reference to FIG. 14. In the first embodiment, the information processing apparatus 1 registers the schedule so as to execute the notifying process by displaying the picture data, e.g., the screen capture to the user at the date and time acquired from the video. Moreover, in the second embodiment, the notifying process is carried out by use of the moving pictures.

On the other hand, in the third embodiment, if the scene on the screen stopped by the user is a notice of broadcasting the TV program, the information processing apparatus 1 implements the recording reservation of a program notified beforehand or a channel at the date and time notified beforehand at the date and time acquired from the video. Other configurations and operations in the third embodiment are the same as those in the first or second embodiment. Such being the case, the same components as those in the first and second embodiments are marked with the same numerals and symbols, and their descriptions are omitted. Moreover, the drawings in FIGS. 1-13 are applied also to the third embodiment as the necessity arises.

Figure 14:
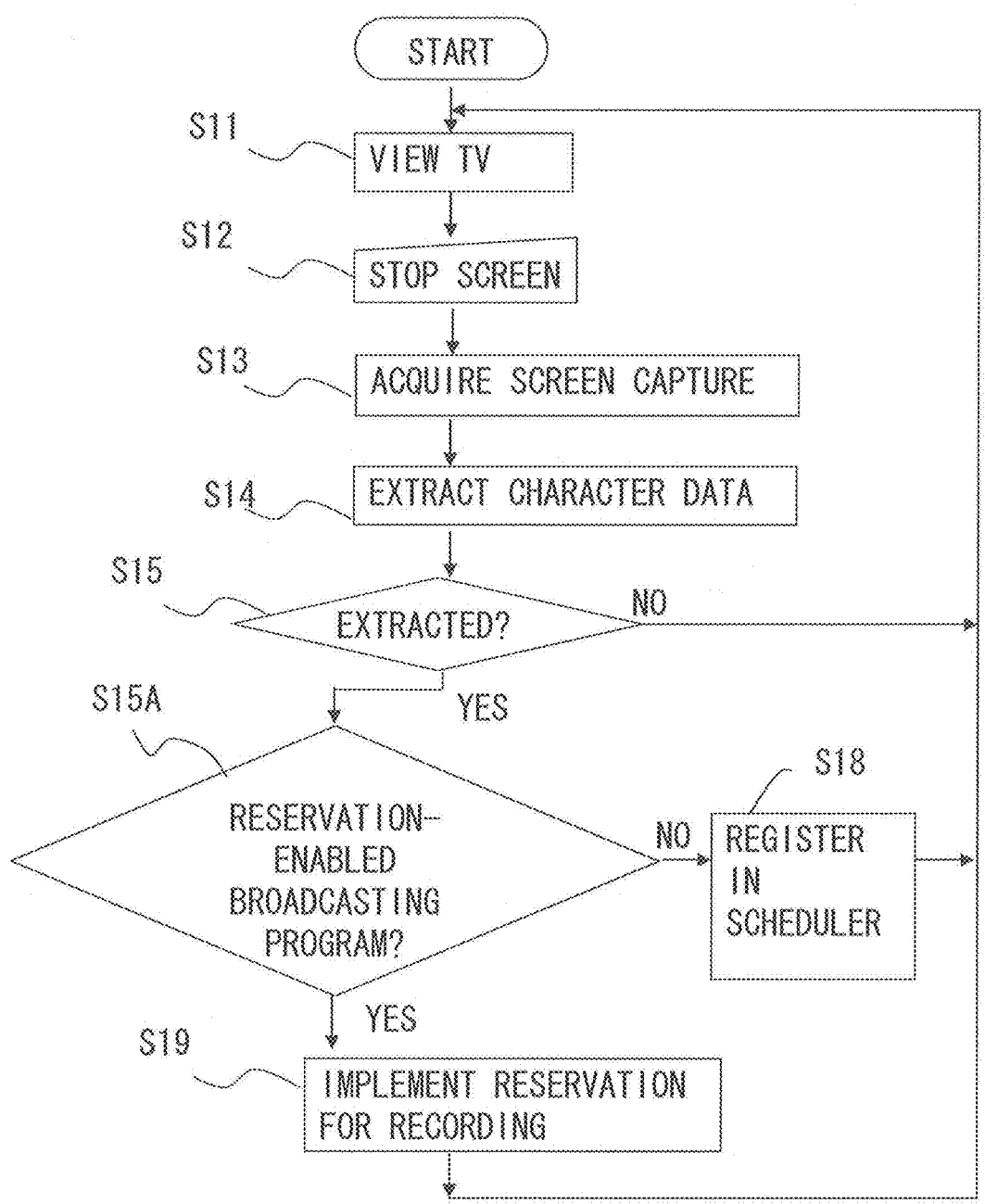
FIG. 14 is a flowchart illustrating the process of acquiring the character data from the scene and registering the data in the scheduler.

FIG. 14 is a flowchart illustrating a process of acquiring the character data from the scene and registering the data in the scheduler 113. The processes in S11 through S15 in FIG. 14 are the same as those in FIG. 10, and hence their descriptions are omitted. When determining in S15 that the character data can be extracted, the control unit 11 determines whether the extracted character data represents a reservation-enabled broadcasting program or not (S15A).

The determination as to whether or not the extracted character data represents the reservation-enabled broadcasting program can be made by determining whether or not the extracted character data contains, e.g., both of a character string related to the broadcasting notice such as "broadcast", "schedule", "start", "channel" and "expecting", and the date and time information from the present point of time onward. Note that the date and time information can be specified by character strings for specifying the date and the time such as "month/day/hour", "month/day/hour/min", "from X o'clock on X day of every week", "00:00 am" and "00:00 pm".

Furthermore, a search for an electronic channel table (Electronic Program Guide; EPG) may be made from the date and time information contained in the extracted character data and a channel number of the received channel (or a name of the broadcasting station corresponding to the channel as a substitute for the channel number). For example, in an environment where the electronic channel table can be acquired from the Internet or a communication line, the information processing apparatus 1 accesses the electronic channel table and may determine whether or not the character data extracted in S14 contains the date and time information of the electronic channel table and a name of the program specified by the channel.

Note that the control unit 11 may make the voice recognition about the voice data output together with the video in addition to the character data extracted from the picture data. Then, the control unit 11 may determine whether the voice-recognized data represents the reservation-enabled broadcasting program or not.

If the extracted character data does not represent the reservation-enabled broadcasting program, the control unit 11 registers the startup of the notifying process in the scheduler 113 (S18). This process is the same as the process in FIG. 1. Whereas if the extracted character data represents the reservation-enabled broadcasting program, the control unit 11 makes the reservation to record the broadcast of the channel that is now being viewed at the extracted date and time (S19). The control unit 11 serving as a reservation recording unit executes the process in S19.

As described above, according to the third embodiment, when detecting the user's operation to stop the scene and if the picture frame included in the stopped scene (one or more GOPs) contains the character string for notifying of the broadcast, the recording of the TV program is reserved at the date and time notified beforehand. Accordingly, the recording is reserved with the extremely simple operation, and the mistake in operation can be reduced.

<Fourth Embodiment>

The information processing apparatus 1 according to a fourth embodiment will hereinafter be described with the reference to FIG. 15. In the first embodiment, the information processing apparatus 1 displays the picture data, e.g., the screen capture to the user at the date and time acquired from the video. Further, in the second embodiment, the notifying process is carried out by using the moving pictures.

On the other hand, in the fourth embodiment, a URL is contained in the screen capture, in which case a page of the URL contained in the screen capture is displayed when executing the notifying process. Other configurations and operations in the fourth embodiment are the same as those in the first or second embodiment. Such being the case, the same components as those in the first and second embodiments are marked with the same numerals and symbols, and their descriptions are omitted. Moreover, the drawings in FIGS. 1-14 are applied also to the fourth embodiment and the third embodiment inclusive as the necessity arises.

Figure 15:
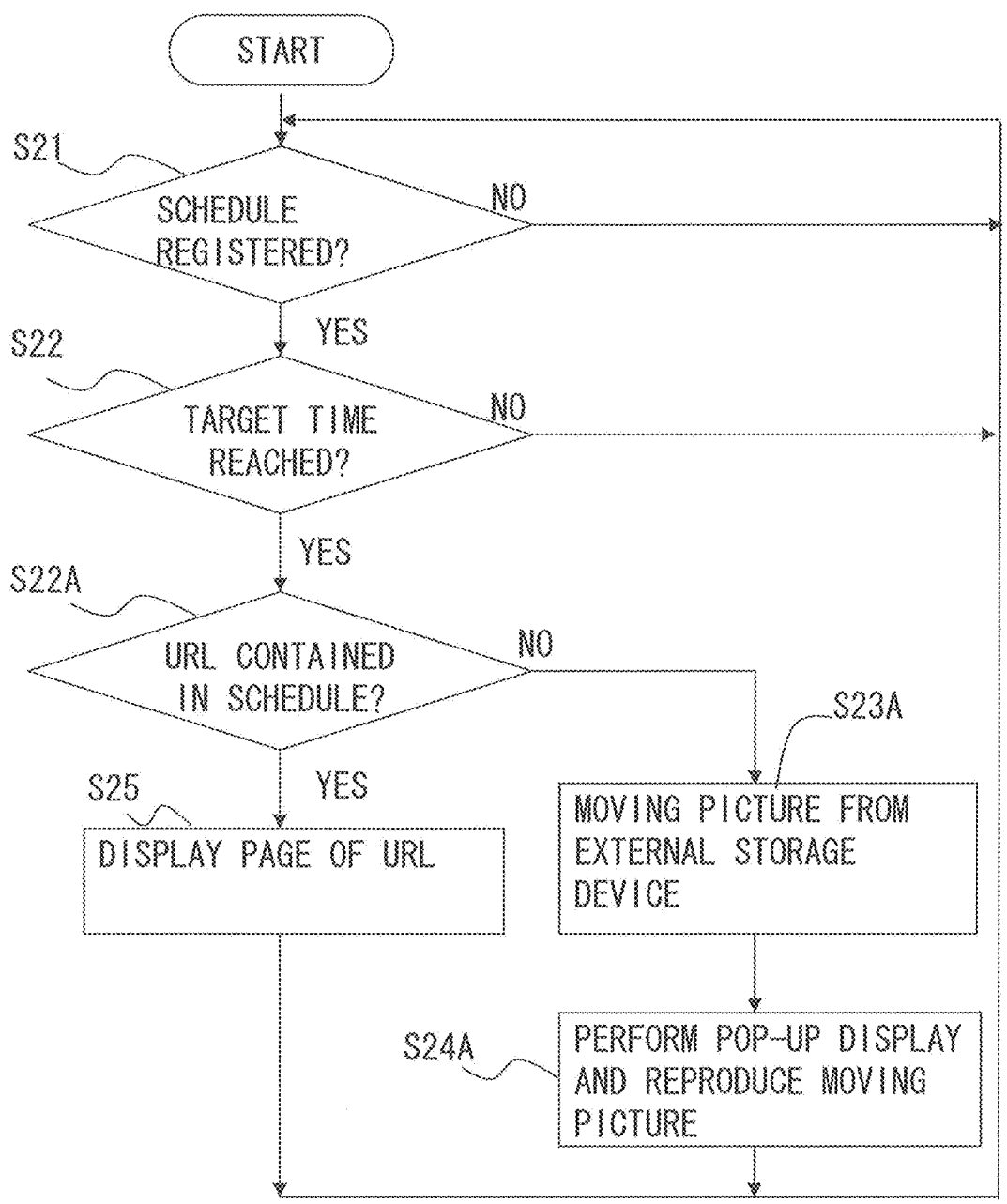
FIG. 15 is a flowchart illustrating the process of the scheduler.

FIG. 15 is a flowchart illustrating the processes of the scheduler 113. The processes in S21 and S22 of FIG. 15 are the same as those in FIG. 11 or 13. Further, the processes in S23A and S24A are the same as those in FIG. 13. This being the case, the descriptions of these processes are omitted.

The scheduler 113, when determining in S22 that it reaches the target time, determines whether the URL is registered in the schedule database 121 or not (S22A). Note that the URL of the schedule database 121 is extracted by the character data extraction process from the screen, e.g., in S14 of FIG. 10 and is set in the schedule database 121. The URL may be distinguished based on whether the character data contains, e.g., "http://" or not. When the URL is registered in the schedule database 121, the scheduler 113 displays the page of the URL on the display 13 (S25).

As described above, according to the information processing apparatus in the fourth embodiment, if the URL is contained in the screen capture or the scene including the screen capture, the URL is displayed when executing the notifying process. Accordingly, if the URL contains more detailed information than the moving picture of the TV commercial, the user can display the information indicated by the URL at the date and time in the vicinity of the acquired date and time.

<Fifth Embodiment>

The information processing apparatus 1 according to a fifth embodiment will hereinafter be described with reference to FIGS. 16 and 17. In the first embodiment, the information processing apparatus 1 registers the schedule so as to execute the notifying process by displaying the picture data, e.g., the screen capture to the user at the date and time acquired from the video.

On the other hand, the fifth embodiment will discuss a process in such a case that there are plural types of acquired date and time information. Other configurations and operations in the fifth embodiment are the same as those in the first through fourth embodiments. Such being the case, the same components as those in the first through fourth embodiments are marked with the same numerals and symbols, and their descriptions are omitted. Moreover, the drawings in FIGS. 1-15 are applied also to the fifth embodiment as the necessity arises.

Figure 16:
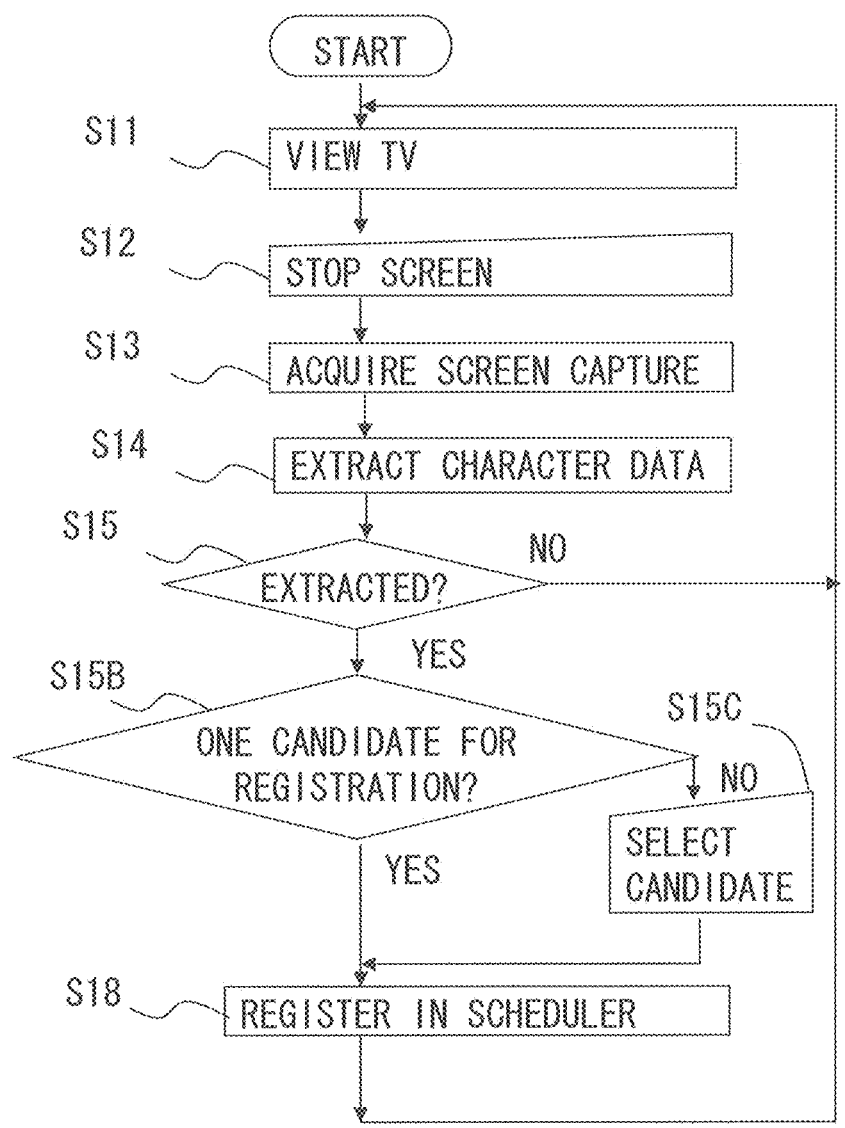
FIG. 16 is a flowchart illustrating the process of acquiring the character data from the scene and registering the data in the scheduler.

FIG. 16 is a flowchart illustrating a process of acquiring the character data from the scene and registering the data in the scheduler 113. The processes in S11 - S15 and S18 of FIG. 16 are the same as those in FIG. 10. When determining S15 that the character data can be extracted, the control unit 11 determines whether there is a plurality of candidates for the registration or not (S15B). Then, if there is the plurality of candidates for the registration, the control unit 11 displays the candidates to the user via the display 13, and prompts the user to select the candidate by use of the operation unit 14. When the user selects the candidate by using the operation unit 14, the control unit 11 accepts the selection (S15C). The control unit 11 executes the process in S15C as a means to accept the registered date and time information. Then, the control unit 11 registers, based on a selection result, the startup of the notifying process in the scheduler 113 (S18).

Figure 17:
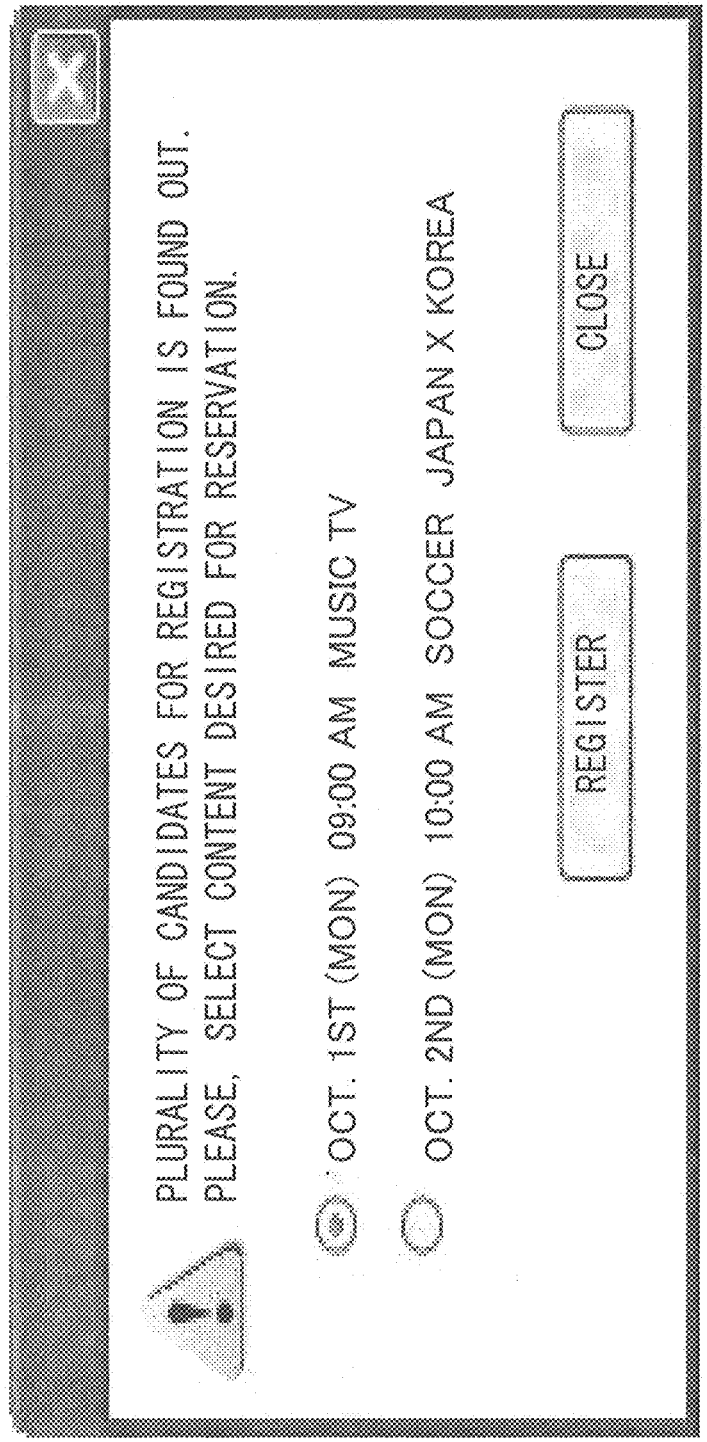
FIG. 17 is a diagram of an example of a screen for prompting the user to select a candidate through an operation unit by displaying the candidates to the user.

FIG. 17 depicts an example of a screen for displaying the candidates to the user and prompting the user to select the candidate through the operation unit 14. This screen example displays a window containing options for reserving the recording of the program together with a message saying "PLURALITY OF CANDIDATES FOR REGISTRATION IS FOUND OUT. PLEASE, SELECT CONTENT DESIRED FOR RESERVATION". When the user specifies the option with a toggle button and indicates a "REGISTER" button with the operation unit 14, the recording of the program is reserved at the date and time of the selected option. The options in FIG. 17 correspond to a list of the date and time information.

Note that FIG. 17 illustrates the example of reserving the recording of the program, however, in the case of the notifying process based on the picture data other than the recording reservation and in the case of there being the plurality of notifying process targets based on the moving picture, the same processes as those in FIGS. 16 and 17 may be executed.

As discussed above, according to the fifth embodiment, even if there being the plurality of processes that are to be registered in the scheduler 113 for the recording reservation or as the notifying process targets, the registration in the scheduler 113 can be easily carried out by prompting the user to select the proper option.

<<Non-Transitory Computer-Readable Recording Medium>>

A program for making a computer, other machines and devices (which will hereinafter be referred to as the computer etc) realize anyone of the functions can be recorded on a recording medium readable by the computer etc. Then, the computer etc is made to read and execute the program on this recording medium, whereby the function thereof can be provided.

Herein, the recording medium readable by the computer etc connotes a recording medium capable of accumulating information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a Blu-ray disc, a Digital Audio Tape (DAT), an 8 mm tape, a memory card such as a flash memory, etc are given as those removable from the computer. Further, a hard disc, a Read-Only Memory (ROM), etc are given as the recording mediums fixed within the computer etc.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus, comprising:
   a display control unit to output a video to a display device on the basis of video data containing a plurality of picture frames;
   an operation unit to accept a user's operation; and
   a registering unit to extract date and time information from an operation target picture frame corresponding to the video that is output when accepting the operation and to register a schedule so as to output information contained in the video at a date and time of the extracted date and time information,
   wherein the video data contains a partial moving picture including an image of the operation target picture frame, and
   the registering unit registers the schedule so as to reproduce the partial moving picture including the image of the operation target picture frame at the date and time of the extracted date and time information.

2. The information processing apparatus according to claim 1, further comprising a recording unit to record the information,
   wherein the registering unit further includes a recording reservation unit to, when the information contained in the video is a notice of a broadcasting program to be broadcasted at the date and time from the present time afterward, reserve a record of the broadcasting program in the recording unit by specifying the date and time information extracted from the operation target picture frame.

3. The information processing apparatus according to claim 1, further comprising:
   a displaying unit to display a list of plural pieces of date and time information when the plural pieces of extracted date and time information exist; and
   an accepting unit to accept the date and time information that is registered in the schedule from the displayed date and time information.

4. An information processing method, comprising:
   outputting a video to a display device on the basis of video data containing a plurality of picture frames;
   accepting a user's operation; and
   extracting date and time information from an operation target picture frame corresponding to the video that is output when accepting the operation; and
   registering a schedule so as to output information contained in the video at a date and time of the extracted date and time information; and
   registering the schedule so as to reproduce the partial moving picture including the image of the operation target picture frame at the date and time of the extracted date and time information,
   wherein the video data contains a partial moving picture including an image of the operation target picture frame.

5. The information processing method according to claim 4, wherein the computer includes a recording unit to record the information, the information processing method further comprising:
   reserving, when the information contained in the video is a notice of a broadcasting program to be broadcasted at the date and time from the present time afterward, a record of the broadcasting program in the recording unit by specifying the date and time of the date and time information extracted from the operation target picture frame.

6. The information processing method according to claim 4, further comprising:
   displaying a list of plural pieces of date and time information when the plural pieces of extracted date and time information exist; and
   accepting the date and time information that is registered in the schedule from the displayed date and time information.

7. A non-transitory computer-readable recording medium having stored therein a program for causing a computer to execute a process comprising:
   outputting a video to a display device on the basis of video data containing a plurality of picture frames;
   accepting a user's operation; and
   extracting date and time information from an operation target picture frame corresponding to the video that is output when accepting the operation and registering a schedule so as to output information contained in the video at a date and time of the extracted date and time information; and
   registering the schedule so as to reproduce the partial moving picture including the image of the operation target picture frame at the date and time of the extracted date and time information,
   wherein the video data contains a partial moving picture including an image of the operation target picture frame.

8. The non-transitory computer-readable recording medium according to claim 7, wherein the computer includes a recording unit to record the information, and the process further comprises:
   reserving, when the information contained in the video is a notice of a broadcasting program to be broadcasted at the date and time from the present time afterward, a record of the broadcasting program in the recording unit by specifying the date and time of the date and time information extracted from the operation target picture frame.

9. The non-transitory computer-readable recording medium according to claim 7, wherein the process further comprises:
   displaying a list of plural pieces of date and time information when the plural pieces of extracted date and time information exist; and
   accepting the date and time information that is registered in the schedule from the displayed date and time information.

* * * * *